Figure 1:
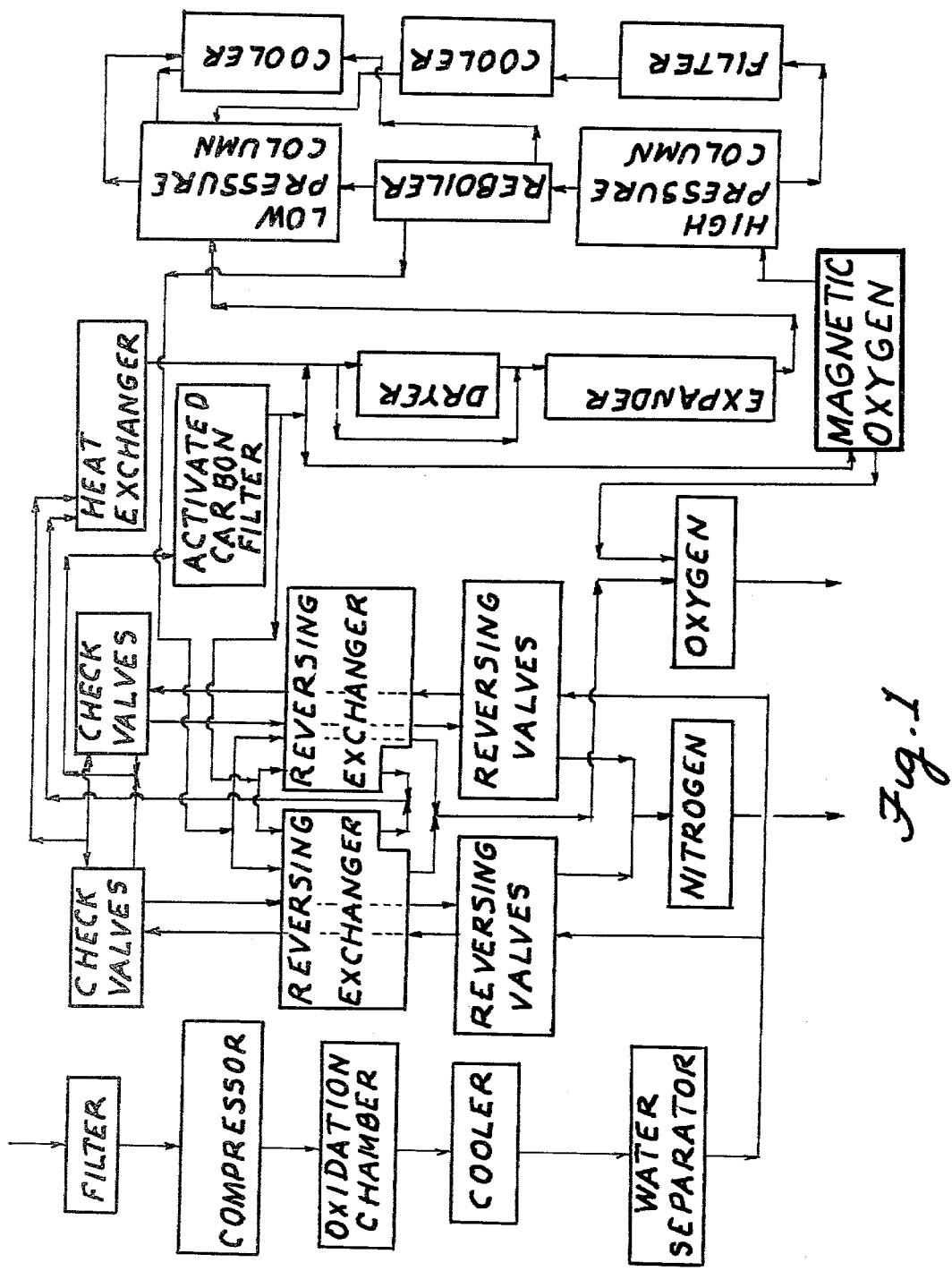
Figure 3:
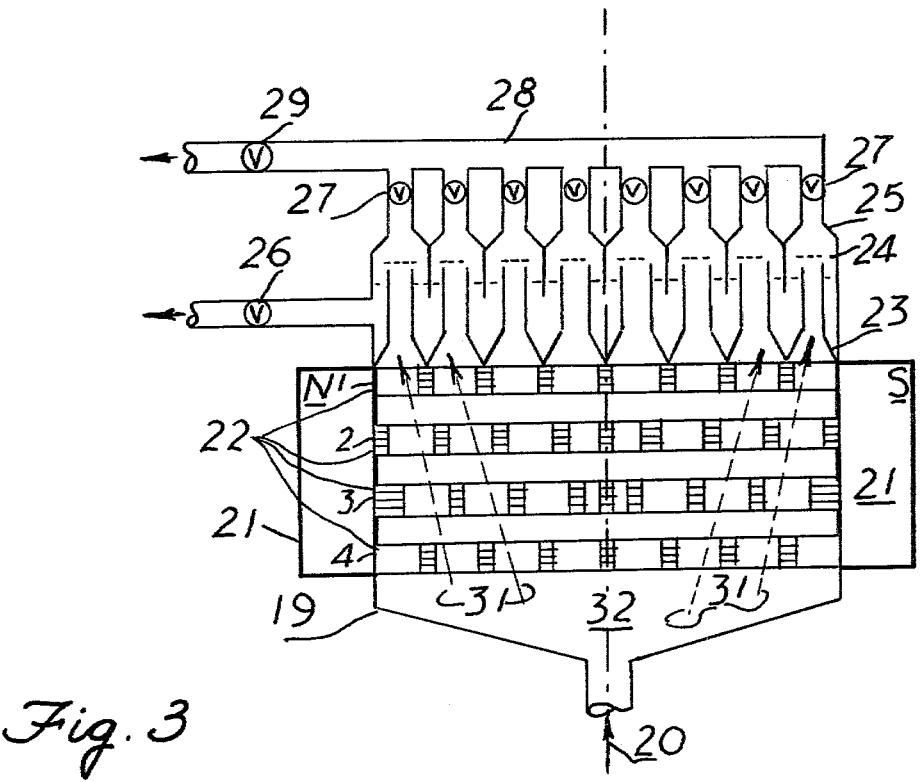
Figure 2:
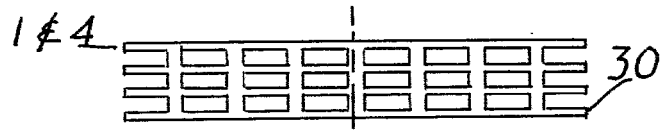
Figure 2:
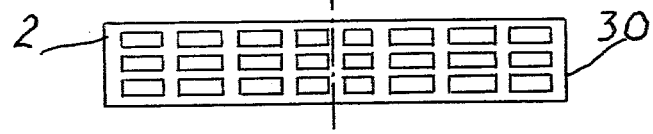
Figure 2:
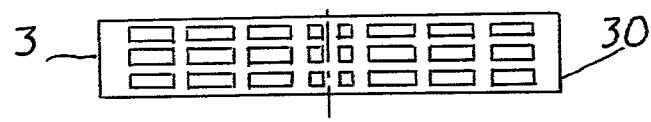
Figure 2:
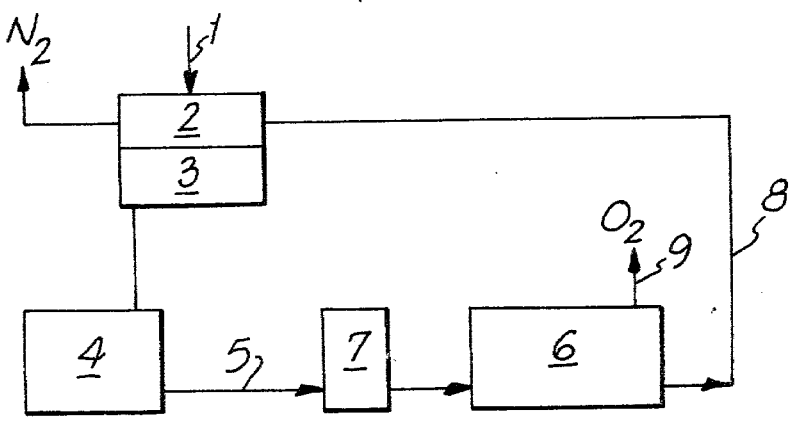

United States Patent [19]

Vaseen

[11] 4,203,740
[45] May 20, 1980

[54] OXYGEN PRODUCTION BY PARAMAGNETIC REMOVAL OF MAGNETIZED OXYGEN FROM LIQUID AIR

[75] Inventor: V. A. Vaseen, 9840 W. 35th Ave., Wheat Ridge, Colo. 80033

[73] Assignee: Vesper Albert Vaseen, Wheat Ridge, Colo.

[21] Appl. No.: 940,905

[22] Filed: Sep. 11, 1978

[51] Int. Cl.$^2$ ............................................. F25J 3/00
[52] U.S. Cl. ............................................. 62/18; 55/3;
55/68; 204/186; 204/155
[58] Field of Search ............... 55/3, 68; 204/186, 155;
62/9, 11, 17, 18; 210/429

[56] References Cited

U.S. PATENT DOCUMENTS

| | | | |
|---|---|---|---|
| 1,056,043 | 3/1913 | Morrison | 62/18 |
| 1,546,632 | 7/1925 | Dow et al. | 55/3 |
| 3,059,110 | 10/1962 | Japolsky | 55/3 |
| 3,066,494 | 12/1962 | Potts | 62/18 |

FOREIGN PATENT DOCUMENTS 1329620  5/1963  France ........................ 204/155

*Primary Examiner*—Norman Yudkoff

[57] ABSTRACT

The production of oxygen by the liquefaction of air at temperatures lower than (−)270° F., followed by the fractional separation of the liquid components is increased in efficiency of oxygen production as well as purity of oxygen produced by inserting into the flow line of the process, my invention of paramagnetic removal of magnetic oxygen. Following the liquefaction of air the liquid air at a temperature, preferably less than −252.87° C. (1 ATM.); is passed through the magnetic flux between the poles of a high intensity magnet. The paramagnetic oxygen is attracted to the two poles, depending on its "Location Polarization", and thus separates from the other liquid nonmagnetic constituents. This concentrated stream of liquid oxygen at temperature generally less than −182.97° C. (1 ATM); or gaseous oxygen if at temperature greater than −182.97° C. (1 ATM); is removed from the system as oxygen. The balance can be further fractionally separated for each constituent or discharged directly back through the reversing heat exchangers to assist in additional air liquefaction.

1 Claim, 3 Drawing Figures

OXYGEN PRODUCTION BY PARAMAGNETIC REMOVAL OF MAGNETIZED OXYGEN FROM LIQUID AIR

DESCRIPTION OF PRIOR ART

Commercial oxygen is produced in two grades, high purity (99.5%) and low purity (90-98%) by liquefaction and subsequent fractionation of air. A number of different cycles have been used. These very in methods of air compression, purification, and refrigeration, as well as in the design of reverse heat exchangers, rectifiers, evaporators, and condenser equipment.

Air consists of an invariable mixture of gases, generally by volume; 78.03 percent nitrogen, 20.99 percent oxygen, 0.94 percent argon, 0.01 percent hydrogen, with traces of neon, helium, krypton, and xenon. It also contains variable quantities of pollutants, etc., such as 0.03 to 0.07 percent (vol.) carbon dioxide, 0.01 to 0.02 percent water vapor, and hydrocarbon gases.

Historically the Joule-Thompson effect, that is, the cooling effect produced by expansion of air with no external work, when expanded, produces a cooling effect is used to liquify air. For example, one kilogram of air of 3000 psi and 10° C. when expanded to 75 psi, produces a cooling effect of 10 kilogram calories.

Cryogenics is the science of very low temperatures. Opinions vary as to where refrigeration ends and cryogenics begins; some authorities say minus 150° F. (−101° C.) and others minus 200° F. (−129° C.).

Basically, cryogenics involves liquefaction and use of various gases that have very low condensing temperatures. These can be liquefied only when cooled to or below their critical temperature, regardless of the pressure involved. Cryogenic gases all have low critical temperatuers, and since they are normally stored as liquids at or close to atmospheric pressure, temperatures lower than critical are usually involved.

The following shows pertinent information about the more prominent cryogenic gases.

| Gas | Critical Temperature | | Boiling Point at 14.696 PSIA (1.0333 Kg/sq cm) | |
|---|---|---|---|---|
| | °F. | °C. | °F. | °C. |
| Methane | −116 | −82 | −259 | −156 |
| Oxygen | −182 | −119 | −297 | −183 |
| Argon | −188 | −122 | −303 | −186 |
| Fluorine | −201 | −129 | −303 | −186 |
| Air | −221 | −140 | −318 | −195 |
| Nitrogen | −233 | −147 | −318 | −195 |
| Neon | −380 | −229 | −411 | −246 |
| Hydrogen | −400 | −240 | −423 | −253 |
| Helium | −450 | −268 | −451 | −269 |

Mixed gases are often liquefied to permit separation into their components. Air is the most important of these gases, accounting for 80 percent or better of the present total activity in cryogenics. Dry air at sea level has the following closely accurate composition. (Data from different sources vary slightly.)

| | By Volume - % | By Weight - % |
|---|---|---|
| Nitrogen | 78.03 | 75.47 |
| Oxygen | 20.99 | 23.19 |
| Argon | 0.94 | 1.30 |
| Carbon dioxide | 0.03 | 0.04 |
| Hydrogen | 0.01 | Trace |
| Neon | Trace | Trace |
| Helium | Trace | Trace |
| Krypton | Trace | Trace |
| Xenon | Trace | Trace |

Nitrogen and oxygen are the principal gases obtained from liquid air by fractional distillation, although some plants also produce argon, neon, krypton, and xenon.

Although large air separation plants may use a form of cascade refrigeration for cooling, the expansion process is more commonly used.

There are four definite steps.

1. Compression. Air is compressed to pressures varying from about 75 to 3000 psig. This uses a conventional compressor.

2. Cooling. The air is cooled to within 10° to 20° of water temperature in an aftercooler. It is cooled further with cold product gases (oxygen and nitrogen) and with auxiliary refrigeration. Contaminants, such as water and carbon dioxide, that would freeze and clog valves, heat exchangers or expanders must be removed at this point.

Large cryogenic plants use regenerators. Incoming gas (or air) is passed through one of two beds of cold packing on which moisture and carbon dioxide is frozen out and the temperature of the incoming gas is reduced at the same time. At fixed time intervals, valves are automatically switched and the cold waste gas (such as nitrogen in an oxygen plant) is passed through the "hot" bed, carrying away the water (ice) and carbon dioxide to atmosphere. At the same time, packing is cooled so the beds can be alternated again and the cycle repeated to continuously cool and remove contaminants from the incoming gas.

Smaller plants, especially in high-pressure cycles, pass the incoming gas (air) through caustic scrubbers (usually between the second and third stages of a reciprocating compressor) to remove carbon dioxide and then through silica gel or another desiccant to remove water. Oil introduced by compressor lubrication (if any) is also removed here. Then the gas (air) is cooled in a heat exchanger by the cold waste gas (nitrogen) and the cold product gas (oxygen) which are warmed to within a few degrees of the incoming air.

3. Expansion. Further cooling is accomplished by throttling the gas through a reducing valve, in which process the Joule-Thomson effect (while neither adding nor taking away heat) lowers the temperature. Greater decrease in temperature can be obtained by using an expansion engine or turbine to remove work or heat from all or part of the gas at the same time the pressure is reduced. Efficiency of the turbine or engine is important, not because of useful work obtained, but because the greater the expander efficiency, the greater the amount of heat removed. In this application, the expander is a refrigeration device and the mechanical work developed is normally wasted.

4. Separation. As a result of this cooling, air is liquefied and sent to a distillation column, where the higher boiling point constituent (oxygen) collects at the bottom as a liquid and the lower boiling point constituent (nitrogen) leaves from the top of the column as a gas.

In an air separation plant this is normally done in two steps. Where 90 to 95 percent oxygen purity is acceptable, one step may be sufficient. The partially liquefied air enters the lower or high-pressure column at a pressure of 70 to 85 psig and a temperature of minus 276° to minus 285°. The rising nitrogen vapors are condensed by contact with the bottom of the upper or low-pressure column that contains liquid oxygen at a pressure of 2 to 5 psig and a temperature of approximately minus 300° F. The condensed nitrogen is expanded into the top of the low-pressure column to aid in final separation. The oxygen-rich liquid from the bottom of the high-pressure column is introduced into the low-pressure column where remaining nitrogen boils off and liquid oxygen is removed from the bottom of the low-pressure (upper) column at 99.5 percent purity. The impurities are largely xenon, krypton, and argon. In a gaseous oxygen plant, this liquid oxygen is warmed and gasified in exchangers, cooling incoming air.

SUMMARY OF INVENTION

Magnetic separation falls under two principal types of governing physical phenomena. Strongly magnetic materials, known as ferromagnetic group, are easily magnetized by a relatively weak magnetic field. As the strength of the magnetic field increases, all the individual domains (regions with paired north and south magnetic poles) in a ferromagnetic material become aligned; and magnetization "saturates" the material. Thereafter its magnetic qualities increase very little, if at all, regardless of any further increase in the strength of a magnetic field around the material. The saturation level, that is, the field strength beyond which no further magnetization takes place, depends on the iron content of the material. Pure iron, for example, is saturated at a magnetization of some 220 electromagnetic units per cubic centimeter in an applied field of several hundred gauss.

Weaker magnetic materials, known as members of the paramagnetic group, are much less susceptible to an applied magnetic field. Paramagnetic materials rarely become saturated so their degree of magnetization continues to increase as the applied magnetic field gets stronger. Although a strong bar magnet will not attract a paramagnetic material, such materials may become more highly magnetized in a sufficiently strong field than dilute ferromagnetic materials.

A third type of behavior in a magnetic field is displayed by materials that become magnetic in an opposite direction to the applied field. These are known as diamagnetic materials.

Ferromagnetic type particulate materials we can classify as "hard" materials and think of them as magnetized particles each acting temporarily as a small bar magnet with a north pole at one end and a south pole at the other end. These magnetically hard materials act as permanent magnets.

Materials which align as magnetic only while in a magnetic field and become random when the field is absent; is herein called "soft" material. When a uniform magnetic field is applied to a magnetized particle, the forces acting on the two poles of the particle are equal and opposite. When an applied magnetic field differs in intensity at the two extremes of a particle, then a net differential magnetic force acts on the particle. The net force exerted on a magnetized particle by a magnetic field is proportional to: (1) the intensity of the magnetization the field has induced in the particle; (2) the volume of the particle; (3) the gradient of the exerted magnetic field; that is, the difference between the intensity of the field at one end of the particle, and the intensity of the field at the other end of the particle.

Paramagnetic materials require a magnetic field of great enough intensity as to cause magnetization of the particles, as well as sufficient gauss flux gradient as to cause the particles to orient with temporary north and south poles.

Some 32 elements form compounds which can be paramagnetic, and 16 elements are paramagnetic in pure form, but the compounds they form are diamagnetic. 7 elements become paramagnetic when one or more are present in a compound; although two of them (N) nitrogen and (Cu) copper are slightly diamagnetic in pure form. It is only necessary here to be interested in oxygen, nitrogen and the nonmagnetic liquid carrier of the absorbed oxygen and nitrogen.

Oxygen being one of the sixteen elements which become paramagnetic in pure form is magnetic and can by being magnetically attracted thus collected from a liquid. Nitrogen being slightly diamagnetic in pure form is thus rejected and left absorbed in the liquid.

The oxygen molecules when in the presence in an intense magnetic field orient as polar molecules with a north and a south pole. Due to the creation of a gradient field the oxygen molecules are then oriented and by nature of the differential forces on the poles created by the gradient field attracted north polar oriented to the south magnetic pole and vice versa. Molecular oxygen in gaseous form collected at each pole combine as they accumulate to form bubbles of free oxygen as the concentration exceeds the solubility of the liquid for absorbed oxygen and release themselves from the liquid as bubbles of oxygen to be collected for removal to storage and/or use.

Molecular oxygen in liquid form collected at each pole concentrate as pure oxygen and reject or displace the nonmagnetic liquid constituents, and thus are collected for removal to storage and/or use.

The invention is illustrated in the drawing in which:

FIG. I is a flow diagram of air separation by a conventional cryogenic expedient and magnetic separation.

FIG. II is a flow diagram of separating oxygen from liquefied air by the magnetic expedient, particularly.

FIG. III is a detail of the magnetic separator employed in FIG. II.

DESCRIPTION DRAWINGS

FIG. II
1. Ambient air
2. Evaporator for oxygen depleted remaining liquid air.
3. Liquefier of cooled air.
4. Liquid air at −0.182.96° C.
5. Liquid air transfer to paramagnetic oxygen separator magnets and apparatus.
6. Paramagnetic oxygen gas separator from liquid air
7. Temperature controller to retain temperature of liquid air between (−) 182.96° C. and (−) 152.30° C.
8. Transfer of oxygen gas depleted liquid air and liquid nitrogen to evaporator.
9. Pure oxygen gas from paramagnetic separator (6).

FIG. III
19. Typical section and plan of oxygen collection system
20. Liquid air
21. High intensity magnet(s)
22. Dielectric—nonmagnetic perforated plates, stacked to move dissolved oxygen to poles
23. Overflow collectors for oxygen depleted 24. Overflow weirs for control of oxygen depleted liquid air and liquid nitrogen 25. Collection hoods for collection and removal of effervesced pure oxygen gas 26. Level and flow rate control valves for flow of liquid air and liquid nitrogen out of system 27. Oxygen gas flow rate balance control valves out of system 28. Oxygen gas collection manifold for transporting pure oxygen gas from system 29. Pressure control valve on release of pure oxygen gas from system to use or storage 30. Typical plan of dielectric nonmagnetic perforated plates with each successive plate with staggered perforations, producing with up flow movement of dissolved oxygen in liquid air, to move toward magnetic poles.

31. Motion of dissolved oxygen gas from homogeneous dissolution in (32) reservoir of liquid air to hetrogeneous supersaturation at or near magnet poles.

The liquified air (4) is passed thru the two magnetic poles, north and south, of an electromagnet (21) in a quantity and with a velocity which provide the time required, permit the absorbed oxygen molecules in the presence of gauss forces sufficient to cause paramagnetic magnetization of the oxygen molecules, to be magnetically attracted (31) to the two poles, north and south, and at or near the magnetic pole surfaces, exceed the solubility ability of the liquid to retain the oxygen as absorbed oxygen, and thus release it as bubbles of free collective molecules, to the oxygen gas collector (25) also installed at or near the surface of the liquid and between the two magnetic poles of the electromagnet.

The imposing of very high intensity gauss forces at the electromagnet (21) to induce paramagnetism reactions on the absorbed oxygen molecules will produce heat.

The heat is used to adjust the temperature of the liquid between the poles to, for instance at 1-ATM, to (−) 183° C., but not higher than 189° C. This temperature range will release the oxygen as gaseous molecules, but retain the nitrogen (−209.80° C.); neon (−248.67° C.), argon (−189.2° C.); and helium (−252.87° C.). The krypton (−156.6° C.) will effervesce with the oxygen gas. Control of the heat loss from the magnet to the liquified air, to retain an operating temperature less than −252.87° C.; permits only the paramagnetic oxygen to magnetize, be attracted to the poles, there concentrated and removed as pure (gaseous) oxygen.

Operation of the electromagnet under a cryogenic environment greatly reduces the power input required to produce high intensity; that is, $10KO_e$, density, more or less.

PREFERRED EMBODIMENT

The liquefaction (2) of air (1) is an art and science well known to the industry and for those versed in the art and science no additional details are hereby required.

Liquid air contains principally: nitrogen, with a magnetic susceptibility of $-12.0 \times 10^{-6}$ cgs (gaseous); and oxygen, with a magnetic susceptibility of $+3,499.0 \times 10^{-6}$ cgs (gaseous); and $+7,699.0 \times 10^{-6}$ cgs (liquid); along with minor quantities of various gases with magnetic susceptibilities as follows: argon (gaseous), $-19.6 \times 10^{-6}$ cgs; carbon dioxide (gaseous), $21.0 \times 10^{-6}$ cgs; hydrogen (gaseous), $-3.98 \times 10^{-6}$ cgs; neon (gaseous, $-6.74 \times 10^{-6}$ cgs; helium (gaseous), $-1.88 \times 10^{-6}$ cgs; krypton, $-28.8 \times 10^{-6}$ cgs; and xenon, $-43.9 \times 10^{-6}$ cgs.

Oxygen having a magnetic susceptibility both as a gas and as a liquid is therefore separable from the other components of liquid air as (gaseous) (25) by magnetic separation (6).

For example liquid air (4) at a controlled temperature (7) and one atmosphere requires the following temperatures to provide the boiling temperature of specific gases.

| Gas | Critical Temperature | | Boiling Point psia (1.0333 Kg/sq. cm.) | |
|---|---|---|---|---|
| | °F. | °C. | °F. | °C. |
| Carbon dioxide | −23.8 | −31 | −109 | −78.5 |
| Xenon | 62 | +16.6 | −161 | −107.1 |
| Krypton | −83 | −63.8 | −242 | −152.30 |
| Oxygen | −182 | −119 | −297 | −182.962 |
| Argon | −188 | −122 | −303 | −185.7 |
| Nitrogen | −233 | −147 | −320 | −195.8 |
| Neon | −380 | −229 | −411 | −246.048 |
| Hydrogen | −400 | −240 | −423 | −252.87 |
| Helium | −450 | −268 | −451 | −268.934 |

Liquid air at a temperature, preferably −186° C. retaining in it the liquid mixture oxygen, argon, nitrogen, neon, hydrogen and helium; is provided between the poles of a magnet producing, for example $10KO_e$, or sufficient to paramagnetize the oxygen molecules (31) in the gap or space between the two poles of the magnet (21). The liquid air is moved through the gap at a velocity which permits the heating of the liquid to −182.962° C., or preferably slightly above but not to exceed −152.30° C., and also provides time, for example, thirty seconds, for the gaseous oxygen (35) thus released, to be magnetically attracted (31) to the north and south poles of the magnet; (21) there due to the supersaturation of the gaseous oxygen in the remaining liquid, it effervesces from the liquid (25) where it is collected (25) and is removed (27)(28)(29) to storage and/or use.

The remaining liquid (air and liquid nitrogen) (23) is thence released (26) back to atmosphere or if fractionally separated for recovery of argon, nitrogen, neon, hydrogen, and helium, in total or in part. During the fractionating the cooling effect of the evaporation (2) is, preferably, used to liquify additional air (1).

Liquid air (32), at preferably less than −269.934° C.; which thus retains all the gases in a liquid phase, is provided between the poles of a magnet (21) producing for example, $10KO_e$, or sufficient to paramagnetize the oxygen molecules in the gap or space between the two poles of the magnet.

Both the north and south poles of the magnet are provided with orifices (22) or similar devices permitting the concentrating paramagnetic oxygen to pass through the holes, (31) adjacent to the poles, to a point of collection, (25) thence removal (27)(28)(29) to storage and/or use.

Cooling of the magnets and their respective poles is preferably to retain the temperature of the liquid air at less than −269° C. Purity of oxygen removed is based on the control (27)(29) of rate of oxygen liquid removed through the (or adjacent to), magnet poles orifices.

The remaining liquid (air and liquid nitrogen) (23)(24) is thence released (26) back to atmosphere or is fractionally separated for recovery of xenon, krypton, oxygen (remaining), argon, nitrogen, neon, hydrogen and helium; in total or in part. During the fractionating the cooling effect of the evaporation (2) is, preferably, used to liquify additional air (1).

The power required to produce, for example a magnetic flux of $10KO_e$ is not only much less at $-182.962°$ C. to $-152.30°$ C.; than at atmospheric; but is even less at $-269.934°$ C.; therefore, preferably the low temperature method is the most efficient of the two.

What is claimed is:

1. An improved method in the production of pure oxygen gas from liquefaction of air, consisting of the steps of;

passing a stream of liquid air through the gap between the north and south poles of a high intensity magnet, having a magnetic force $10KO_e$ great enough to create paramagnetic forces on the dissolved oxygen atoms and molecules, at a temperature of the liquid air between $(-)182.96°$ C. and $(-)152.30°$ C., at a velocity and movement of liquid air and liquid nitrogen mass within the liquid air which permits migration of the dissolved gaseous oxygen to the magnet poles, thus supersaturating the liquid nitrogen and liquid air with paramagnetic oxygen gas, which form bubbles and effervesce from the liquid air mass, collecting the gaseous oxygen above the liquid air surface and removing oxygen to use or storage, then disposing of remaining liquid air and liquid nitrogen by evaporation, using the cooling from heat absorption for cooling additional air.

* * * * *